April 23, 1963

L. E. HURTT 3,086,704

COSINE-SECANT MULTIPLIER

Filed Nov. 24, 1961

INVENTOR.
LEON E. HURTT
BY
Knox & Knox

April 23, 1963  L. E. HURTT  3,086,704
COSINE-SECANT MULTIPLIER
Filed Nov. 24, 1961  3 Sheets-Sheet 2

INVENTOR.
LEON E. HURTT
BY Knox & Knox

United States Patent Office 3,086,704
Patented Apr. 23, 1963

3,086,704
COSINE-SECANT MULTIPLIER
Leon E. Hurtt, La Mesa, Calif., assignor to
Ryan Aeronautical Co., San Diego, Calif.
Filed Nov. 24, 1961, Ser. No. 154,670
6 Claims. (Cl. 235—61)

The present invention relates generally to computing means and more particularly to a cosine-secant multiplier.

Background

Various types of ball and disc drive mechanisms have been used for variable speed drives and other purposes involving a change of ratio between an input rotation and an output rotation. In the field of computers, such devices have been used to perform trigonometrical functions, such as multiplying an input proportional to some specific value by the sine, cosine or other component of a particular angle. As one example, a navigational computer may include means to provide a latitude-longitude reference from input signals representing speed, direction and time, such a function being usually performed by a ball and disc integrator and sine-cosine resolver in conjunction. Many of these mechanisms are complex, have a limited range of useful operation and are of considerable size in comparison to their function. Further, some of the input shafts must have adjustable axes due to mechanical limitations, which complicates the coupling of signal and control sources thereto.

Objects and Drawings

The primary object of this invention, therefore, is to provide a cosine-secant multiplier which performs the complete function within itself and is extremely compact with a minimum number of parts.

Another object of this invention is to provide a cosine-secant multiplier in which the input, output and control shafts all have fixed axes, so that connections thereto in a computer installation are greatly simplified.

Another object of this invention is to provide a cosine-secant multiplier in which slippage between the moving friction drive components is eliminated, and wherein any one of the rotatable shafts can be moved at any time without the danger of frictional wear which might result in loss of accuracy or reduction in useful life of the device.

A further object of this invention is to provide a cosine-secant multiplier which is fully enclosed within its mounting, against ingress of foreign matter, to ensure accuracy.

Finally, it is an object to provide a cosine-secant multiplier of the aforementioned character which is simple and convenient to construct and install and which will give consistent results over a wide range of operating conditions.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

General Structure

Figure 1:
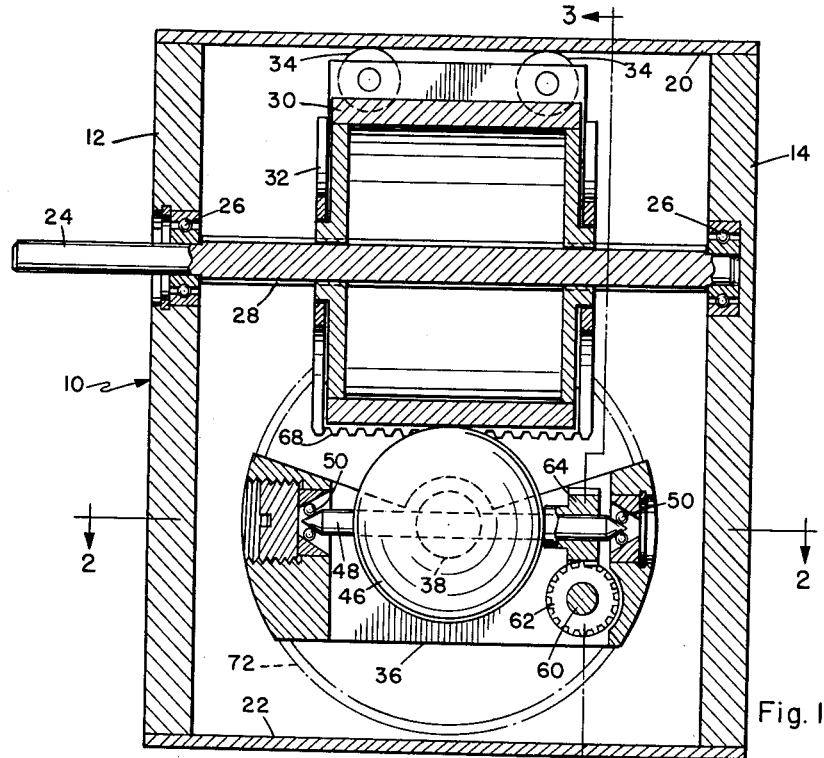
FIGURE 1 is a sectional view of the mechanism as taken on line 1—1 of FIGURE 2.
Figure 2:
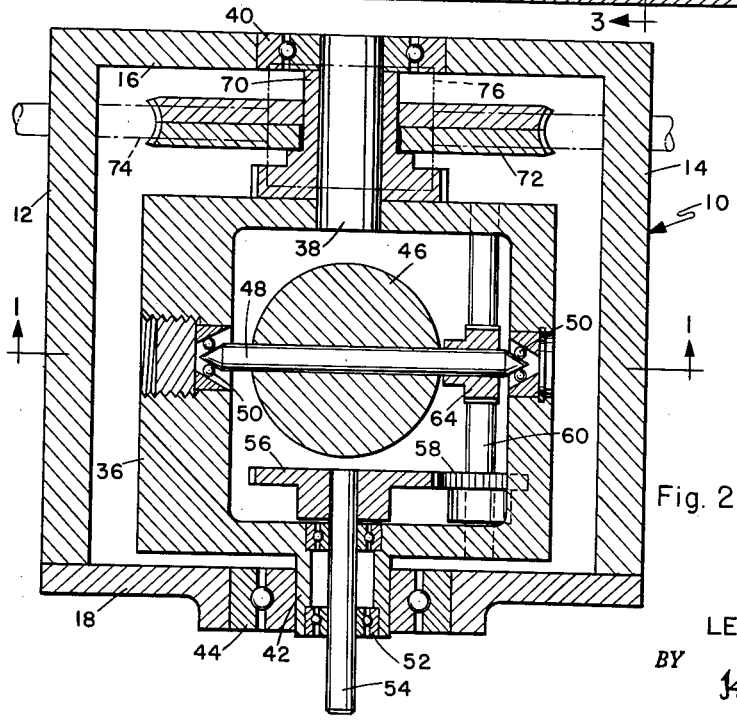
FIGURE 2 is a sectional view as taken on line 2—2 of FIGURE 1.

Referring now to FIGURES 1-4 of the drawings, the mechanism is mounted in a rectangular, box-like frame 10 having side walls 12 and 14 and a back wall 16, the frame being enclosed by a front plate 18 and top and bottom plates 20 and 22, respectively. The positional references are for purposes of description only, since the unit is operable in various attitudes. Extending between side walls 12 and 14 is a drum shaft 24 journalled in bearings 26, said shaft having a splined portion 28. Mounted on the drum shaft 25 is a cylindrical drum 30 keyed to the splined portion 28 to rotate with said shaft while being axially slidable thereon. Straddling the drum 30 is a yoke 32 which slides together with the drum, the upper portion of the yoke being fitted with rollers 34 which roll freely on the underside of top plate 20.

Below the drum 30 is an open, rectangular cage 36 which swings about an axis normal to the axis of said drum. The rear of cage 36 is supported by a stub shaft 38 held in a bearing 40 in back wall 16, the front of said cage having a sleeve portion 42 which is held in a large bearing 44 in the front plate 18, coaxial with bearing 40. Inside the cage 36 is a spherical ball 46 fixed to a support shaft 48 which is held between bearings 50 in the sides of the cage, the axis of shaft 48 being normal to the common axis of bearings 40 and 44. The rotational axis of ball 46 is parallel in one plane to the axis of drum 30 and is tiltable in that plane by swinging the cage 36. In order to maintain frictional driving contact between the ball 46 and drum 30, the distance between bearings 26 and the center of said ball is very slightly less than the combined radii of drum and ball. Thus the shaft 24 is bowed, by a few thousandths of an inch, to ensure proper contact. Other means of obtaining the required pressure are obviously possible.

Within the sleeve portion 42 are bearings 52 carrying a ball drive shaft 54 on which is a gear 56. This gear 56 engages a second gear 58 on a transfer shaft 60 extending from front to rear of cage 36 and carrying a helical gear 62 which engages a mating helical gear 64 on the ball support shaft 48. By use of the helical gearing, the shaft 54 can be turned to rotate ball 46, or the ball can be rotated to turn the shaft.

It will be noted that the ball 46 is of smaller radius than the drum 30, in order to make a more compact assembly, the resultant difference in rotational speeds being compensated for by a difference in size between gears 56 and 58.

Figure 3:
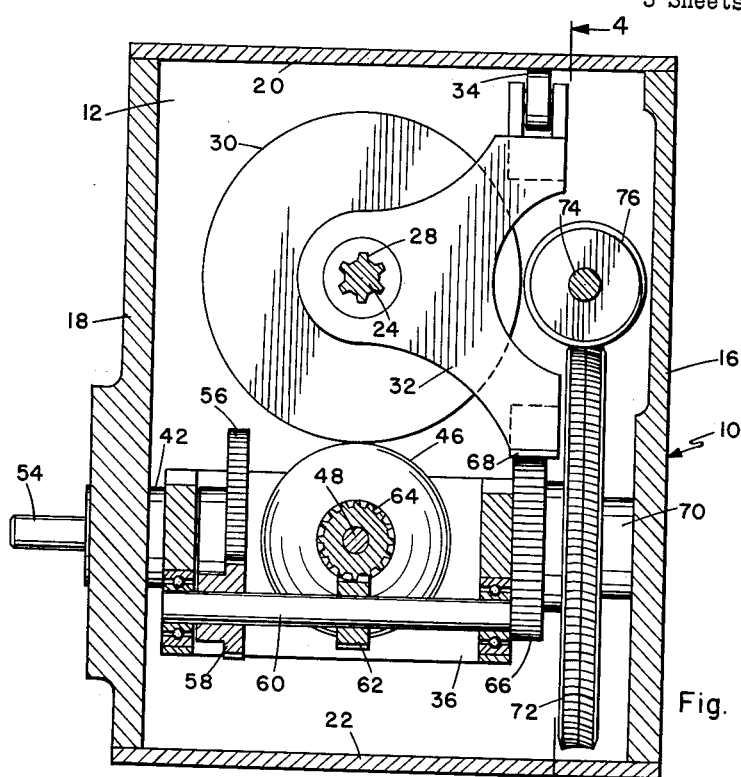
FIGURE 3 is a sectional view as taken on line 3—3 of FIGURE 1.
Figure 4:
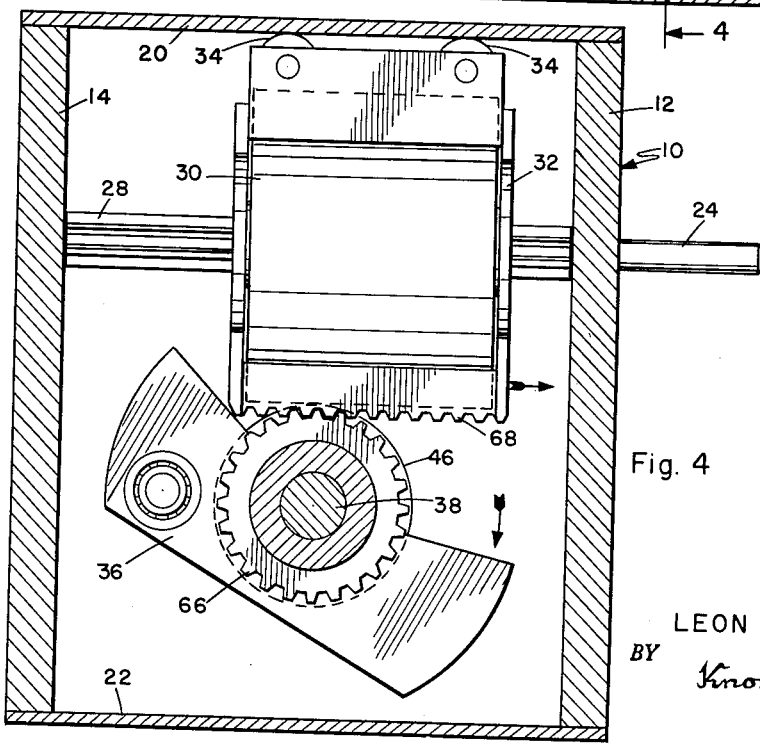
FIGURE 4 is a sectional view as taken on line 4—4 of FIGURE 3.

Fixed to the stub shaft 38 is a pinion 66 which engages a transverse rack 68 secured to the lower portion of yoke 32. When the cage 36 tilts, the pinion 66 moves the rack 68 and slides the yoke 32 and drum 30 along shaft 24 as indicated in FIGURE 4, the size of said pinion being such that the contact point of the drum with the ball is maintained without slippage as the cage is tilted. In other words, the linear shift of the drum surface is equal to the peripheral displacement of the ball surface about the axis of tilt. The pinion 66 has an extended hub 70 which serves as a spacer from the bearing 40, and fixed to the hub is a large worm gear 72, anti-backlash type. Across the frame between side walls 12 and 14 is an angle control shaft 74 carrying a worm 76 which engages worm gear 72, as indicated in FIGURE 3 and in broken line in FIGURE 1, so that rotation of said shaft causes tilting of the cage 36 and consequently of the rotational axis of ball 46.

Operation

Basically, if the drum shaft 24 is driven, the rotational speed of the ball drive shaft 54 will be equal to the rotational speed of the drum shaft multiplied by the secant of the angle between the drum shaft axis and the ball rotational axis of support shaft 48. Conversely, if the ball is driven through the drive shaft 54, the rotational speed of drum shaft 24 will be equal to the rotational speed of shaft 54 multiplied by the cosine of the angle between drum shaft and ball rotation axes.

In the application to a navigational system, such as in an aircraft, the motion in an east or west direction would be applied as a rotation of drum shaft 24. The instantaneous latitude would be applied to the angle control shaft 74 to provide the appropriate angular offset of the ball rotational axis and, as a result, the rotation of ball drive shaft 54 would provide an output corresponding to the rate of change of longitude.

Certain types of navigational equipment presently available can provide information regarding velocity, direction, drift and, with reference to a known position at some specific time, indicate a bearing and distance to obtain a position. Change of latitude is directly proportional to distance, the reference lines of latitude being parallel to the equator. Due to the convergence of longitude reference lines toward the poles, however, rate of change of longitude is not constant, but is related to latitude. The present mechanism performs the necessary conversion and makes it possible to provide readouts directly in terms of latitude and longitude, so avoiding the necessity for measuring distances on a map to obtain position.

The actual function of the mechanism is represented by the equation: $W_{out} = W_{in} \sec \theta$. Where $W_{out}$ is the rotational speed of ball drive shaft 54, $W_{in}$ is the rotational speed of drum shaft 24 and $\theta$ is the angle between the axis of the drum 30 and the axis of ball support shaft 48. In relation to a navigational system, the equation can be expressed as: $\Delta Long = \Delta D_{E/W} \sec Lat.$ Where $\Delta Long$ is the change in longitude, $\Delta D_{E/W}$ is the distance travelled east or west and Lat. is the instantaneous latitude.

For other purposes, the equation $W_{out} = W_{in} \cos \theta$ can be solved by driving shaft 54 as an input and obtaining the output from drum shaft 24.

For best accuracy and maximum torque-transmitting ability, the ball and cylinder should be made of very hard material, accurately machined and with a very smooth surface finish. Bearing play and runout should be minimized.

It should be noted that the stub shaft 38 can be extended from the unit and used directly to tilt the cage 36, without the need for the worm drive mechanism.

*Modified Structure*

Figure 5:
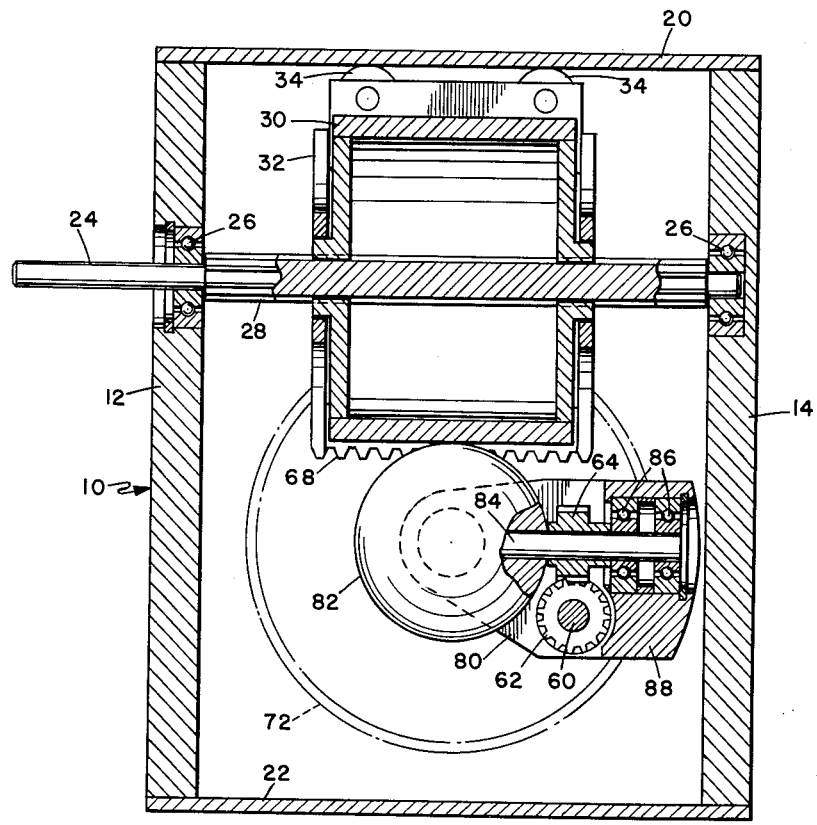
FIGURE 5 is a sectional view similar to FIGURE 1, showing a modified form of the mechanism.

Due to mechanical limitations, the mechanism described above is limited to a range of about plus or minus 70 degrees, which is ample for most purposes. However, it may be desirable to extend the range of movement and this can be accomplished by the structure illustrated in FIGURE 5. In this configuration, all of the components are identical to that previously described with the exception of the cage and ball mounting. One side of the cage is removed to make an open, generally U-shaped cage 80, which is pivotally mounted and moved in the manner of cage 36. The ball 82 is carried by a support shaft 84 held in double bearings 86 in the side portion 88 of cage 80 and is driven by helical gears 62 and 64 as before.

This arrangement leaves the major portion of the ball 82 exposed, so that the cage 80 can swing more than 180 degrees without striking the drum. With the ball rotational axis at the 90 degree position, pependicular to the drum axis, driving motion between ball and drum will be zero, and through a small angle on either side of this position the transfer of rotation will be so small as to make accurate reading impractical. However, the extended range may be useful for some purposes, particularly at slow rotational speeds.

*Advantages*

The mechanism is extremely compact, contains few moving parts and can easily be buit into various equipment assemblies since the input and output shafts and the angle adjustment shaft are all in fixed positions. Very little torque is needed to operate the mechanism and any of the shafts can be turned at any time without damaging the structure. Due to the coupling of the ball tilting means and the drum sliding means, proper driving contact is maintained without slippage at all times, resulting in less wear and greater accuracy over extended periods. The very slight bowing of the drum shaft is sufficient to maintain driving contact between drum and ball, without the need for springs or special frictional surfaces.

It is understood that minor variation from the form of the invention disclosed herein may be made without departure from the spirit and scope of the invention, and that the specification and drawing are to be considered as merely illustrative rather than limiting.

I claim:

1. A cosine-secant multiplier, comprising:
  a frame;
  a cylindrical drum axially rotatably mounted in said frame;
  a substantially spherical ball rotatably mounted in said frame in driving contact with said drum and being rotatable on an axis parallel in one plane with the axis of the drum;
  driving means connected to said drum and said ball to rotate the same selectively;
  control means to tilt said ball about an axis normal to the rotational axis thereof, whereby the ball rotational axis is inclined at a selected angle relative to the rotational axis of said drum;
  said drum being axially slidable;
  and means interconnecting said control means with said drum to slide the drum and maintain slip-free contact of the ball and drum as the ball is tilted.

2. A cosine-secant multiplier, comprising:
  a frame;
  a drum shaft axially rotatably mounted in said frame;
  a cylindrical drum rotatable with and axially slidable on said drum shaft;
  a cage mounted in said frame and being tiltable about an axis normal to the axis of said drum;
  a substantially spherical ball mounted in said cage and having a support shaft rotatable on an axis parallel in one plane to the axis of said drum, said ball being in driving contact with said drum;
  a drive shaft coupled to rotate said ball about the axis of said support shaft;
  control means connected to said cage to tilt the rotational axis of said ball relative to the axis of said drum;
  and means interconnecting said cage with said drum to slide the drum as the rotational axis of said ball is tilted and maintain slip-free contact between the ball and drum.

3. A cosine secant multiplier according to claim 2, wherein said drive shaft is concentric with the pivotal axis of said cage;
  and reversible gearing coupling said drive shaft and said support shaft for rotation in either direction.

4. A cosine-secant multiplier, comprising:
  a frame;
  a drum shaft axially rotatably mounted in said frame;
  a cylindrical drum rotatable with and axially slidable on said drum shaft;
  a cage mounted in said frame and being tiltable about an axis normal to the axis of said drum;
  a substantially spherical ball mounted in said cage and having a support shaft rotatable on an axis parallel in one plane to the axis of said drum, said ball being in driving contact with said drum;

a drive shaft coupled to rotate said ball about the axis of said support shaft;

an angle control shaft connected to said cage to tilt the rotational axis of said ball relative to the axis of said drum;

and coupling means interconnecting said cage and said drum to slide the drum axially as said ball is tilted and maintain slip-free contact therebetween.

5. A cosine-secant multiplier according to claim 4, wherein said drum shaft, said drive shaft and said angle control shaft all have fixed axes of rotation.

6. A cosine-secant multiplier, comprising:

a frame;

a drum shaft axially rotatably mounted in said frame;

a cylindrical drum rotatable with and axially slidable on said drum shaft;

a cage mounted in said frame and being tiltable about an axis normal to the axis of said drum;

a substantially spherical ball mounted in said cage and having a support shaft rotatable on an axis parallel in one plane to the axis of said drum;

the distance between the center of said ball and the axis of said drum being slightly less than the combined radii of the ball and drum, whereby said drum shaft is bowed and driving contact is maintained between the ball and drum;

a drive shaft coupled to rotate said ball in either direction about the axis of said support shaft;

angle control means connected to said cage to tilt the rotational axis of said ball relative to the axis of said drum;

and means interconnecting said cage with said drum to slide the drum as the rotational axis of said ball is tilted and maintain slip-free contact between the ball and drum.

References Cited in the file of this patent

UNITED STATES PATENTS

| | | |
|---|---|---|
| 1,953,894 | Crouse | Apr. 3, 1934 |
| 2,858,980 | Bargmann | Nov. 4, 1958 |